UNITED STATES PATENT OFFICE.

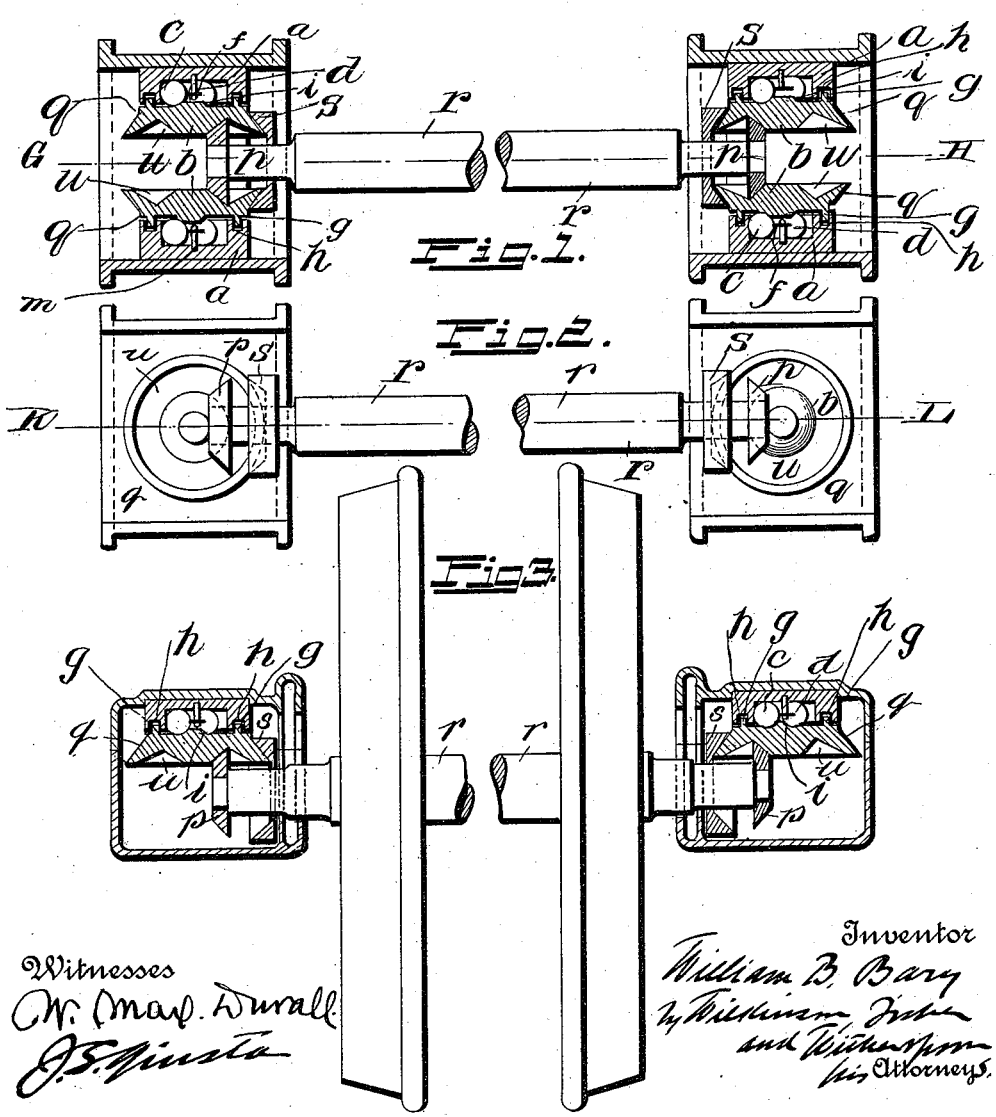

WILLIAM B. BARY, OF ST. PETERSBURG, RUSSIA.

ROLLER-BEARING.

975,201.

Specification of Letters Patent.  Patented Nov. 8, 1910.

Application filed June 23, 1909. Serial No. 503,919.

*To all whom it may concern:*

Be it known that I, WILLIAM B. BARY, citizen of the United States, and a resident of St. Petersburg, Russia, whose post-office address is No. 7 Isaacs Place, St. Petersburg, have invented certain new and useful Improvements in Roller-Bearings, of which the following is a specification.

Figure 1, is a sectional view of the invention taken on the line K—L of Fig. 2, and Fig. 2, is a plan view of the parts shown in Fig. 1, and Fig. 3, is a plan view partly in section showing the application of this invention to a car axle box, as an illustration.

The mechanism consists of a cup $a$, plate $b$, preferably three balls, two only being shown in the drawings, respectively $c$ and $d$ and a distributer of the balls $f$ consisting of a light triangular equal-sided plate rotating freely on a stand $m$. The plate $b$ is furnished with an annular border $g$ entering freely into the slot $h$ turned in the cup $a$, owing to which fact the mechanism is protected from dust etc. inside. The plate $b$ has a tapered boss $i$, which touches all the three balls simultaneously.

Taking as a basis the fact that a plane is determined by three points, the number of balls should be limited to three, in which case the transmission of pressure to all the three balls of the mechanism is secured even in the case of their not being of absolutely equal diameter. In order to attain the best action the centers of the balls must be in a horizontal plane.

In order to obtain a bearing without sliding friction the mechanisms mentioned above are inserted into the boxes shown in Fig. 1. The covers of the mechanisms have tapered grooves $u$ and an exterior taper border in this case.

The shaft journal $r$ is furnished with rings $p$ and $s$ having smooth surfaces. The wheels $p$ enter the grooves $u$ and the wheels $s$ touch the side borders $q$ and by direct contact transmit rotation to the plates $b$, which rotate on the balls $c$, $d$.

Fig. 3 shows the application of this mechanism to a car axle box for instance, in which case only one mechanism may be utilized, this latter being inserted in the upper half of the box as pressure is transmitted to the axle only from the top.

Thus owing to the proposed mechanism sliding friction is replaced by the rolling friction of the taper wheels of the shaft or axle along plates and of the balls along tapered surfaces on the horizontal surfaces of plates $b$ and cups $a$.

What I claim is:

1. In a roller bearing, the combination of a base portion provided with an annular groove and having a boss integral therewith; a wheel supporting said base portion and operating in said groove; a plurality of balls supported on said base portion; a distributer plate for the balls; a top portion; and a tongue and groove connection between said top and base portion, substantially as described.

2. In a roller bearing the combination of an axle; a supporting wheel carried by said axle; a base portion provided with an integral boss and an annular groove in which said wheel operates; an annular projecting rim carried by said base portion; a top bearing portion provided with an annular groove fitting said rim; a plurality of balls carried by said base; and a distributer plate for the balls pivotally mounted on the top portion; said boss fitting between said balls and constituting a bearing surface, substantially as described.

In testimony whereof, I have signed my name to this specification in the presence of two subscribing witnesses.

WILLIAM B. BARY.

Witnesses:
 H. A. LOVIAGUINE,
 J. WANSCLEIDT.